May 4, 1954 L. W. RAINARD Re. 23,824

PROCESS FOR TREATING PROTEINACEOUS FIBERS

Original Filed July 14, 1948 2 Sheets-Sheet 1

INVENTOR.
Leo W. Rainard
BY
N. J. Cook
Atty

May 4, 1954 L. W. RAINARD Re. 23,824

PROCESS FOR TREATING PROTEINACEOUS FIBERS

Original Filed July 14, 1948 2 Sheets-Sheet 2

INVENTOR.
Leo W. Rainard
BY
N. J. Peck
Atty

Reissued May 4, 1954

Re. 23,824

UNITED STATES PATENT OFFICE 23,824

PROCESS FOR TREATING PROTEINACEOUS FIBERS

Leo W. Rainard, Nyack, N. Y., assignor to Alexander Smith, Incorporated, a corporation of New York Original No. 2,575,837, dated November 20, 1951, Serial No. 38,657, July 14, 1948. Application for reissue November 19, 1952, Serial No. 321,535

7 Claims. (Cl. 19—66)

Matter enclosed in heavy brackets [ ] appears in the original patent but forms no part of this reissue specification; matter printed in italics indicates the additions made by reissue.

This invention relates to a method for improving the characteristics of proteinaceous fibers, and more particularly to a method for imparting a controlled crimp to wool and other naturally resilient proteinaceous fibers having similar characteristics.

An object of the invention is to provide a method for imparting controlled characteristics to proteinaceous fibers.

Another object is to provide a method for producing a fiber characterized by a predominant, sharp, angular bend or crimp with the portions between bends substantially straight.

Another object is to provide a novel and improved process for imparting an artificial crimp to wool fibers.

Another object is to provide a commercial process for improving the properties of wool fibers and in particular for imparting a predetermined crimp to fibres which in their natural state do not have the desired degree or crimp.

Another object is to provide a process of the above type in which the crimp is permanently set into the fibers.

Another object is to provide a crimping process of the above type which is adapted for use in conjunction with the usual processes for converting stock wool into yarn.

Various other objects and advantages will be apparent as the nature of the invention is more fully disclosed.

It is known that certain wools, such as South American, New Zealand, Iceland, Leicester, and others are naturally less highly crimped than wools from other localities and breeds and are less useful for many purposes, such as for use as fabric pile. Also the lower grade portions of fleece from blooded sheep are generally less highly crimped than the finer fibers. The lack of crimp of such wools affects their tensile strength, compressibility, resilience, crispness of fabrics made from such wools, covering power and the processing, such as carding and spinning, and may determine the limiting fineness of the yarns spun from these wools. The addition of crimp to such wools and to wools higher than carpet grade, but lower than fine clothing grade, would increase their usefulness.

The present invention provides for adding crimp to such wools and may also be used to improve the characteristics of the highly crimped natural wools. The product obtained is uniform and predictable as to characteristics.

In accordance with one embodiment of this invention, the crimp is produced mechanically by feeding the fibers between feed rolls into a crimping chamber which is maintained full of fibers under a predetermined back pressure. As the fibers are forced into the crimping chamber, they are laid in a zig-zag form and are pressed to form sharp angular bends or crimps with intervening straight portions, the length of which depends upon several factors, such as the nature of the pretreatment and the pressure to which the fibers are subjected in the crimping chamber.

The crimp is set by treatment with steam under controlled conditions of time, temperature, moisture and pH in the range below which the natural resilience of the fibers resists deformation and above which degradation occurs, the relationship being such that the fibers are brought to the plastic condition necessary for the formation of a permanent crimp.

The novel features which are characteristic of this invention will be better understood by referring to the following description, taken in connection with the accompanying drawings in which a specific form of crimping apparatus has been set forth for purposes of illustration.

Figure 1:
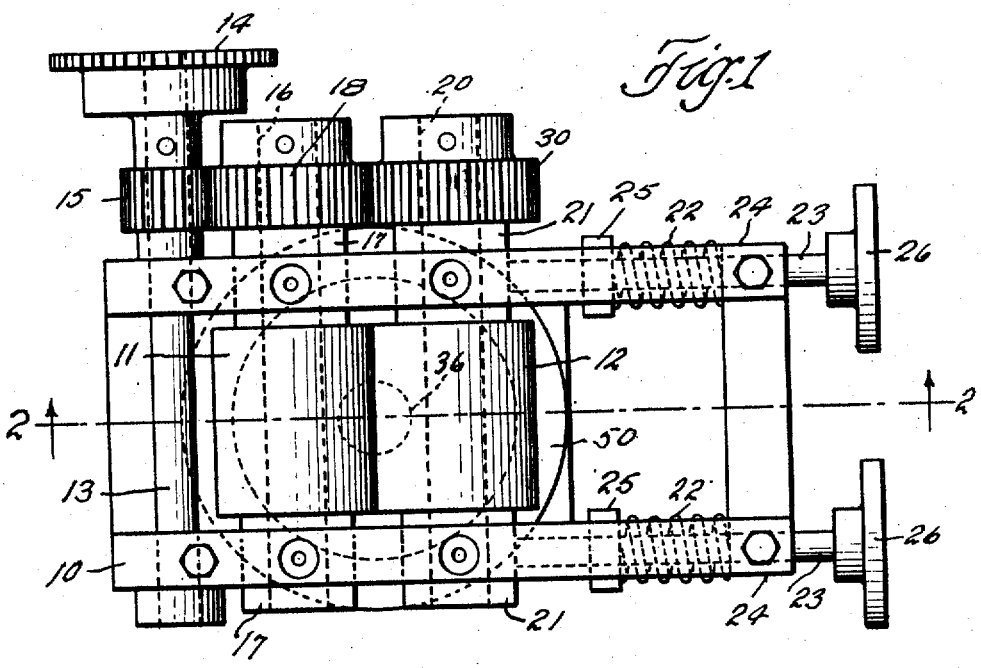
Fig. 1 is a top plan view of an apparatus embodying the present invention.
Figure 4:
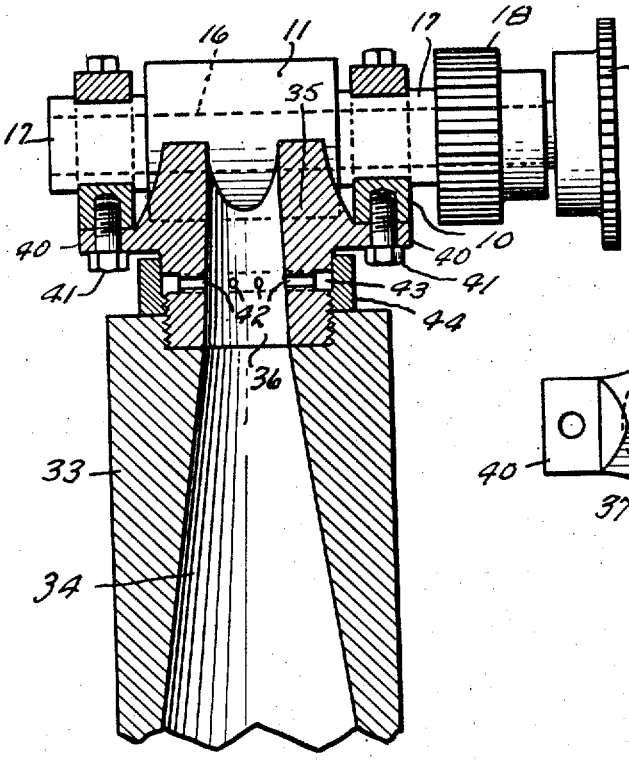
Fig. 4 is a transverse vertical section taken along the line 4—4 of Fig. 2.
Figure 5:
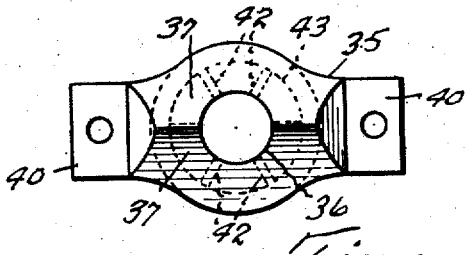
Fig. 5 is a detail view of the saddle.
Figures 2, 3:
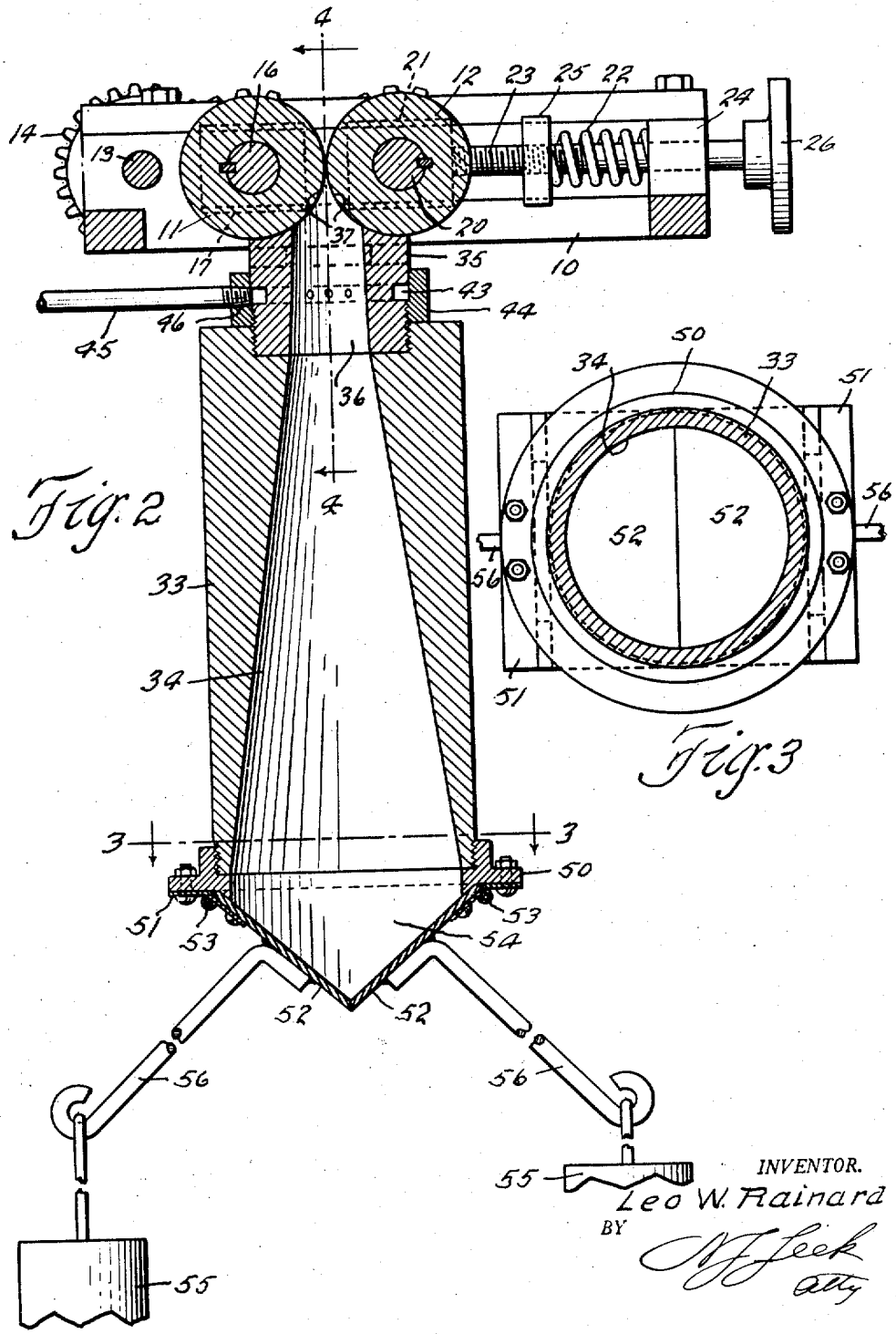
Fig. 2 is a vertical section taken along the line 2—2 of Fig. 1.
Fig. 3 is a horizontal section taken along the line 3—3 of Fig. 2.

Referring to the drawings more in detail, the crimper is shown as comprising a frame 10 carrying a pair of feed rolls 11 and 12 and drive shaft 13. The shaft 13 is journalled in the frame 10 and carries a sprocket 14 which is driven by a suitable power source, not shown, and a pinion 15. The feed roll 11 is keyed to a shaft 16 journalled in bearing blocks 17 fixed to the frame 10 and carrying a gear 18 meshing with the pinion 15. The feed roll 12 is keyed to a shaft 20 journalled in bearing blocks 21 which are slidable in the frame 10. The roll 12 is held in pressure engagement with the material fed between the rolls by springs 22 seated around threaded rods 23 which bear against the bearing blocks 21. The rods 23 extend through a bracket 24 attached to the frame 10 and carry nuts 25 and adjusting knobs 26. The nuts 25 are held against rotation by the frame 10. The springs 22 are seated between the nuts 25 and the bracket 24 and their tension may be adjusted by means of the knobs 26.

The shaft 20 carries a gear 30 meshing with the gear 18. The gears 18 and 30 have teeth of sufficient depth to remain in mesh throughout the normal range of sliding movement of the shaft 20 during the operation of the crimper.

Positioned below the rolls 11 and 12 is a tube 33 having a conical bore 34, forming a setting chamber. The tube 33 is attached to a saddle 35 having a tapered central bore 36 forming a crimping chamber and having a curved upper surface 37 conforming to the bight of the rolls 11 and 12 and machined to have a slight running clearance from the surface of the rolls. The saddle 35 is formed with ears 40 which are attached to the frame 10 by bolts 41 and with a plurality of radial passages 42 for the injection of a setting agent into the crimping chamber. The radial passages 42 communicate with an annular passage 43 in the saddle 35 which is closed by a collar 44 to form an inlet manifold. The fluid is supplied to the annular passage 43 by a pipe 45 registering with a port 46 in said collar.

At its lower end the tube 33 carries a flanged extension 50 to which a pair of brackets 51 are attached. A pair of doors 52 are hinged to the brackets 51 by hinges 53 and are held closed against the tapered end 54 of the extension 50 by weights 55 attached to arms 56 secured to the doors.

In the operation of the crimper, the rolls 11 and 12 are driven by any suitable source of power and the fibers to be crimped are fed thereto, preferably in the form of a rope or a web. The fibers are held in the crimping and setting chambers by the doors until they have been packed sufficiently to force the doors slightly open against the force of the weights 55. The back pressure of the packed fibers causes the fibers being forced against the packed fibers by the feed rolls to be folded over in zig-zag crimps, the spacing of which depends upon the nature of the fibers and the back pressure.

A setting agent, such as steam, is introduced through the pipe 45 and passages 42 into the mass of packed fibers. Of course the area of injection may be varied, but should be sufficiently spaced below the top of the saddle 35 so that the mass of fibers forms a seal. The pressure of the steam and the tapered setting chamber help to overcome or reduce the friction of the fibers against the walls and facilitate their passage through the setting chamber.

In the present process, the raw wool is first opened, scoured, for example with soap and soda ash in several stages, then washed and dried in the usual manner to form stock wool. The scouring and washing may be carried out under conditions to leave the stock wool with the desired pH for crimping. This stock wool is fed directly at a uniform rate to the feed rolls 11 and 12 of the crimper through a suitable hopper or may be fed to a web-forming device such as a card and fed as a web or condensed into a rope which is fed to the feed rolls 11 and 12 as a sliver or slubbing. If a more uniform feed is required, the stock wool may be picked and carded and condensed to a rope for the above purpose after one or more stages of carding. A uniformity in density of feed stock is preferred to prevent jamming or slipping at the feed rolls or undue lateral movement of the feed rolls.

In either case, the fibers are stuffed by the feed rolls 11 and 12 into the crimping chamber and through the setting chamber and are forced out of the bottom of the setting chamber against the pressure exerted by the discharge doors 52.

The back pressure at the entrance of the crimping chamber controls the size of the crimp, a higher pressure causing a finer crimp (more crimps per inch) and vice versa.

For equilibrium conditions of moisture content and pH, the setting time varies inversely with the temperature. For temperatures below 212° F., hot water may be injected into the crimping and setting chambers and may contain added chemicals to aid in producing a permanent set. For example such setting agents as thioglycolic acid and its salts, such as calcium or sodium thioglycolate, formaldehyde, a sulfoxylate formaldehyde, such as zinc or sodium, and the like, may be used. At a temperature of 212° F. the maximum concentration of these agents before serious degradation occurs is as follows:

| | Per cent weight of the wool |
|---|---|
| Thioglycolic acid | 3 |
| Zinc sulfoxylate formaldehyde | 5 |

Formaldehyde does not degrade the fibers and may be used in commercially available concentrations.

For higher temperatures, steam under pressure may be used. The quality of steam should be selected to cause the fibers to reach the desired temperature and moisture content. Due to the packing of the mass of fibers, they are relatively impermeable to steam and steam pressures suited to produce the desired high temperatures may be used.

The fibers may enter the crimper at a pH of 4.0 to 9.0. Steam may be injected under conditions to raise the temperature of the fibers to between 212° F. and 300° F. and produce a moisture content in the fibers leaving the setting chamber of 20% to 55%. A higher moisture content is not detrimental and may be desirable in certain instances. With a pH of 8.0 to 9.0 a setting time of 60 to 70 seconds at 240° F. to 250° F. is sufficient to produce a set that will resist boiling for three minutes in water, or a 90 minute dyeing cycle with little loss in crimp as evidenced by frequency and amplitude determinations. With a pH of 4.0 to 4.5 at the same temperature, a setting time of 120 second to 160 seconds is required to produce the same resistance to loss of set. In general the setting time varies inversely with the pH, the other conditions being the same.

The crimped fibers emerge from the crimper in the form of a very condensed tow or rope, which is easily opened and separated. It may then be carded, formed into a roving and spun in the usual manner.

The fiber thus crimped is characterized by sharp angular bends or crimps which may or may not be uniformly spaced, but are separated by relatively straight lengths of fiber. It may be spun into yarn and skein dyed or may be picked and stocked dyed in the usual manner.

The artificially crimped yarn above described may be used for pile and woven into pile fabrics such as Axminster rugs. It has been found that pile made of this yarn has a greater covering power than uncrimped or naturally crimped wool, is more uniform and has a greater wear resistance. It also makes available for such use wools which do not have sufficient natural crimp for such purpose.

It is evident that the process may be varied as to the individual steps and sequence and that changes and modifications may be made in the apparatus without departing from the scope of the invention.

What is claimed is:

1. The method of imparting a permanent artificial crimp to textile fibers, which comprises gripping said fibers between closely spaced conveyor surfaces discharging into a substantially closed zone, and forcing the gripped fibers into said zone against the pressure of a mass of fibers held compacted under pressure in said zone, said pressure being adapted to cause the fibers to be progressively folded over and crimped as they are delivered from said conveyor surfaces, holding the mass of crimped fibers compacted under a substantially constant pressure to retain the crimp therein, introducing a setting agent under pressure into said zone, treating the mass while thus compacted with said setting agent under conditions to produce a permanent set of said crimp in said fibers, and withdrawing the crimped fibers from said zone.

2. The method set forth in claim 1 in which the setting agent is steam.

3. The method set forth in claim 1 in which the setting agent is a member selected from the group consisting of thioglycolic acid, a thioglycolate, formaldehyde, and a sulfoxylate formaldehyde.

4. The method set forth in claim 1 in which the fibers are maintained in said zone at a temperature of 212° F. to 300° F. and with a moisture content above 20% at the discharge point.

5. The method set forth in claim 4 in which the setting agent is steam.

6. An artificially crimped proteinaceous fiber having crimps separated by relatively straight fiber lengths and obtained as a product of the process defined in claim 1.

7. *The method of imparting a permanent artificial crimp to textile fibers, which comprises gripping said fibers between closely spaced conveyor surfaces discharging into a substantially closed zone, and forcing the gripped fibers into said zone against the pressure of a mass of fibers held compacted under pressure in said zone, said pressure being adapted to cause the fibers to be progressively folded over and crimped as they are delivered from said conveyor surfaces, holding the mass of crimped fibers compacted under a substantially constant pressure throughout their travel in said zone to retain the crimp therein, and heating the mass while thus compacted in said zone to a temperature above that at which the natural resilience of the fibers resists deformation and below that at which degradation occurs to bring the fibers to the plastic condition necessary to set said crimp.*

References Cited in the file of this patent or the original patent

UNITED STATES PATENTS

| Number | Name | Date |
|---|---|---|
| 1,186,229 | Ray | June 6, 1916 |
| 1,353,337 | Gordon | Sept. 21, 1920 |
| 1,719,899 | Mudd | July 9, 1929 |
| 2,043,586 | Kronheim | June 9, 1936 |
| 2,139,543 | Finlayson et al. | Dec. 6, 1938 |
| 2,156,723 | Esselman et al. | May 2, 1939 |
| 2,217,113 | Hardy | Oct. 8, 1940 |
| 2,300,791 | Lodge | Nov. 3, 1942 |
| 2,311,174 | Hitt | Feb. 16, 1943 |
| 2,321,757 | Lodge | June 15, 1943 |
| 2,390,572 | De Brabander | Dec. 11, 1945 |
| 2,394,165 | Getaz | Feb. 5, 1946 |

FOREIGN PATENTS

| Number | Country | Date |
|---|---|---|
| 338,269 | Germany | June 30, 1921 |